United States Patent [19]
Junge et al.

[11] 3,862,977
[45] Jan. 28, 1975

[54] NITRATION OF N-(2-CYANOPHENYL)-N',N'-DIALKYLFORMAMIDINES

[75] Inventors: Helmut Junge, Wachenheim; Hans-Juergen Quadbeck-Seeger, Ludwigshafen, both of Germany

[73] Assignee: Badische Anilin- & Soda-Fabrik Atkiengesellschaft, Ludwigshafen/(Rhine), Germany

[22] Filed: Jan. 22, 1973

[21] Appl. No.: 325,737

[30] Foreign Application Priority Data
Jan. 22, 1972  Germany.............................. 2203051

[52] U.S. Cl............................................. 260/465 E
[51] Int. Cl........................................... C07c 121/78
[58] Field of Search ....................... 260/465 E, 688

[56] References Cited
UNITED STATES PATENTS

| | | | |
|---|---|---|---|
| 2,370,558 | 2/1945 | Mares .............................. | 260/688 X |
| 2,826,611 | 3/1958 | Fischback et al. .............. | 260/688 X |
| 3,711,552 | 1/1973 | Foster et al. ..................... | 260/688 X |

*Primary Examiner*—Lewis Gotts
*Assistant Examiner*—Dolph H. Torrence
*Attorney, Agent, or Firm*—Johnston, Keil, Thompson & Shurtleff

[57] ABSTRACT

A process for the production of N-(o-cyanophenyl)-N,N'-disubstituted formamidines bearing nitro substituents in the 4-position or the 6-position comprising the nitration of the corresponding compounds having no nitro substituent. The process is distinguished by its high selectivity.

6 Claims, No Drawings

NITRATION OF N-(2-CYANOPHENYL)-N',N'-DIALKYLFORMAMIDINES

The invention relates to a process for the production of compounds of the formula (I):-

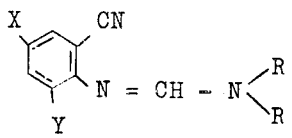

or their salts of the formula (Ia):-

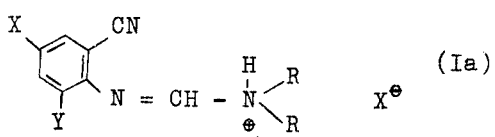

in which
X is hydrogen, chlorine, bromine or nitro,
X⁻ is an anion,
Y is chlorine, bromine or nitro,
R are identical or different alkyl and one R may be phenyl and either X or Y is nitro,
wherein a compound of the formula (II):-

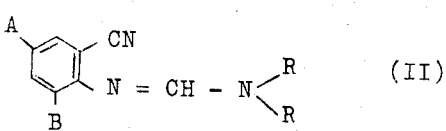

or a salt thereof of the formula (IIa):-

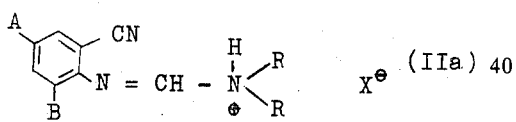

in which
A is hydrogen, chlorine or bromine; and
B is hydrogen, chlorine or bromine, and
either A or B is hydrogen and
R has the meanings given above, is nitrated.

The alkyl R may have for example one to four carbon atoms; it is preferably methyl.

Compounds of the formula (II) or (IIa) used as starting materials for the new process may be obtained for example from o-amino-benzontriles of the formula (III) or particularly advantageously from anthranilamides of the formula (IV):-

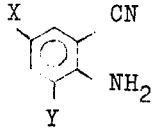

(III)

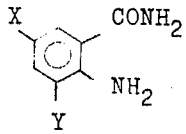

(IV)

by reaction with an N,N-disubstituted formamidinium salt or with a disubstituted formamide and an acid chloride such as phosgene, phosphorus oxychloride, phosphorus pentachloride and thionyl chloride (see also our application Ser. No. 235,017, filed March 15, 1972, now abandoned).

The process according to the invention is advantageously carried out by treating a compound of the formula (II) or a salt thereof of the formula (IIa) either with from 60 to 100 percent nitric acid or with a mixture of nitric acid or a salt thereof with at least 70 percent sulfuric acid which may contain up to 10 percent of free sulfur trioxide. The temperature chosen depends on the strength of the nitric acid or nitrating acid. For example nitration with from 65 to 85 percent nitric acid is carried out at from 40° to 100°C, preferably at from 60° to 80°C, and with from 85 to 100 percent nitric acid or with nitrating acid at from −20° to +50°C, preferably from 0° to 30°C.

Examples of salts of nitric acid are sodium, potassium and ammonium nitrate. The anion X⁻ of the formamidine salts may also be the nitrate $NO_3^-$ or another anion depending upon the reactants employed. Thus, phosgene and thionyl chloride will provide the anion Cl⁻, phosphorous oxychloride will provide the anion $OPOCl_2^-$, and the different acids will provide the anions $NO_3^-$, $SO_4^{2-}$ and $HSO_4^-$.

The reaction product may be isolated by diluting the reaction mixture with water and separating the reaction product, which is present as a salt or as the free base depending on the basicity. The aqueous reaction solution or suspension (which may be acid, neutral or alkaline) may be immediately used however for further reactions, for example for eliminating the formamidine radical or disubstituted ammonium radical.

Introducing the nitro group into the compounds of the formula (II) or (IIa) surprisingly takes place specifically. When the 4-position is unoccupied, the nitro group enters the 4-position exclusively; if the 4-position is occupied, nitration takes place in the 6-position. It is therefore possible by the new process to prepare for example very pure N-(2-cyano-4-nitrophenyl)-formamidine.

It is furthermore surprising that neither elimination nor oxidation of the formamidine radical takes place and that no hydrolysis of the cyano group occurs.

Amidines and their salts which are obtainable by the new process are valuable intermediates, for example for dyes.

The following Examples illustrate the invention. The parts specified are parts by weight. Parts by volume bear the same relation to parts by weight as the liter to the kilogram.

EXAMPLE 1

173 parts of N-(o-cyanophenyl)-N',N'-dimethylformamidine is introduced into 300 parts by volume of 90 percent sulfuric acid and nitration is carried out at from 0° to 20°C with 134 parts of a mixture of 50 parts of 96 percent sulfuric acid and 50 parts of 100 percent nitric acid. The whole is stirred for another hour, diluted with water or poured onto ice and the mixture is neutralized with 25 percent aqueous ammonia solution. The precipitated reaction product is suction filtered, washed with water and dried. 212 parts (97 percent of theory) of N-(2-cyano-4-nitrophenyl)-N,N'-dimethylformamidine is obtained (melting point: 141° to 142°C).

EXAMPLE 2

135 parts of a mixture of 52 parts of 100 percent nitric acid and 48 parts of 96 percent sulfuric acid is dripped at 20°C into a solution of 208 parts of N-(2-cyano-6-chlorophenyl)-N',N'-dimethylformamidine in 300 parts by volume of sulfuric acid monohydrate and the mixture is stirred for another hour. It is then diluted with about 500 parts of water and 500 parts of ice, stirred and filtered. The filter residue is introduced into 1000 parts of water. After neutralization the product is suction filtered, washed and dried. 232 parts (92 percent of theory) of N-(2-cyano-4-nitro-6-chlorophenyl)-N',N'-dimethylformamidine is obtained (melting point: 149° to 151°C).

EXAMPLE 3

173 parts of N-(o-cyanophenyl)-N',N'-dimethylformamidine is dissolved in 300 parts by volume of 98 percent sulfuric acid, nitration is effected with 70 parts of 98 percent nitric acid at 20° to 30°C and the whole is stirred for another hour at 20°C. The reaction mixture is then poured onto 1000 parts of ice, stirred for another hour and suction filtered. The product is washed with cold dilute sulfuric acid once and dried on clay. 291 parts (92 percent of theory) of N-(2-cyano-4-nitrophenyl)-N',N'-dimethylformamidinium hydrogen sulfate is obtained.

If the reaction product is to be isolated as amidine, the moist filtered material is introduced into about 1000 parts of water, made neutral, suction filtered and washed with water and dried. 203 parts of N-(2-cyano-4-nitrophenyl)-formamidine (93 percent of theory) is obtained with a melting point of 142°C.

EXAMPLE 4

350 parts of N-(2-cyano-4-bromophenyl)-N',N'-dimethylformamidinium hydrogen sulfate is introduced at 0°C into 500 parts by volume of 98 percent nitric acid and stirred for 2 hours. The mixture is diluted with about 1800 parts of water and neutralized with 25 percent aqueous ammonia solution. The precipitate is suction filtered, washed with water and dried. 276 parts (93 percent of theory) of N-(2-cyano-4-bromo-6-nitrophenyl)-N',N'-dimethylformamidine is obtained. Its melting point is 144° to 146°C.

EXAMPLE 5

332 parts of N-(2-cyano-6-bromophenyl)-N',N'-dimethylformamidinium hydrochloride is introduced into 300 parts by volume of 98 percent sulfuric acid, stirred for another 30 minutes, 70 parts of 98 percent nitric acid is allowed to drip in at from 0° to 10°C and the whole is stirred for another hour. The whole is then diluted with 2000 parts of water, the pH of the mixture is adjusted to from 2 to 4 with 30 percent caustic soda solution and the product is suction filtered, washed and dried. 289 parts (94 percent of theory) of N-(2-cyano-4-nitro-6-bromophenyl)-N',N'-dimethylformamidine is obtained. Melting point: 155° to 157°C.

EXAMPLE 6

244 parts of N-(2-cyano-4-chlorophenyl)-N',N'-dimethylformamidinium hydrochloride is dissolved in 300 parts by volume of 5 percent oleum, nitrated at from −5° to +5°C with 65 parts of 98 percent nitric acid, stirred for another hour and diluted with 2000 parts of water. After neutralization the product is suction filtered, washed with water and dried. 240 parts (95 percent of theory) of N-(2-cyano-4-chloro-6-nitrophenyl)-N',N'-dimethylformamidine is obtained. Melting point: 129° to 131°C.

We claim:
1. A process for the production of an N-(2-cyano-4-nitrophenyl)-N',N'-disubstituted or N-(2-cyano-6-nitrophenyl)-N',N'-disubstituted formamidine of the formula:

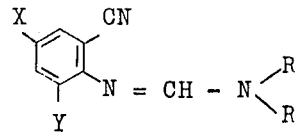

or a salt thereof of the formula:

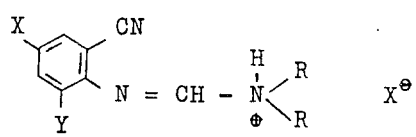

in which
X is hydrogen, chloro, bromo or nitro,
X⁻ is an anion selected from the group consisting of NO₃⁻, SO₄²⁻, HSO₄⁻, Cl⁻ and OPOCl₂⁻,
Y is chloro, bromo or nitro,
R in each case is alkyl of 1 to 4 carbon atoms and either X or Y is nitro,
which process comprises nitrating a compound of the formula:

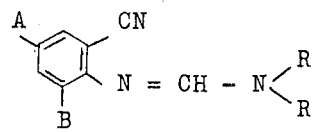

or a salt thereof of the formula:

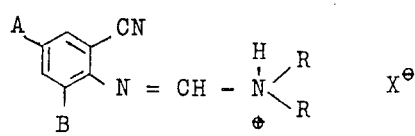

in which
A is hydrogen, chloro or bromo; and
B is hydrogen, chloro or bromo; and either
A or B is hydrogen and
R has the meaning given above, by reaction (a) with 60 to 100 percent nitric acid at a temperature of from −20° to 100°C. or (b) with nitric acid or sodium, potassium or ammonium nitrate in at least 70 percent sulfuric acid at a temperature of from −20° to 50°C.

2. A process as claimed in claim 1 wherein nitration is carried out with from 60 to 85 percent nitric acid at a temperature of from 40° to 100°C.

3. A process as claimed in claim 1 wherein nitration is carried out in at least 70 percent by weight of sulfuric acid with nitric acid at a temperature of from −20°C. to +50°C.

4. A process as claimed in any of claim 1 wherein the alkyl R is methyl.

5. A process as claimed in claim 1 wherein nitration is carried out in at least 70 percent by weight of sulfuric acid with a salt selected from the group consisting of sodium, potassium and ammonium nitrate at a temperature of from −20°C. to +50°C.

6. A process as claimed in claim 1 wherein nitration is carried out with from 85 to 100 percent nitric acid at a temperature of from −20°C. to +50°C.

* * * * *